Nov. 29, 1949   J. L. RAY   2,489,586
ACCELERATION CONTROL APPARATUS
Filed March 3, 1945

Inventor
James L. Ray
by K. S. Wyman
Attorney

Patented Nov. 29, 1949

2,489,586

UNITED STATES PATENT OFFICE 2,489,586

ACCELERATION CONTROL APPARATUS

James L. Ray, Elm Grove, Wis., assignor to Allis-Chalmers Manufacturing Company, Milwaukee, Wis., a corporation of Delaware Application March 3, 1945, Serial No. 580,765

19 Claims. (Cl. 60—41)

This invention relates generally to the control of power plants or units of the type in which the speed of a fluid expanding prime mover is accelerated and decelerated by varying heat input and thereby the temperature of the motive fluid prior to and/or during the expansion of same and more particularly to the provision of apparatus for automatically varying the rate of heat input so as to prevent either an overheating or a too rapid cooling of parts.

One type of power plant to which the invention is particularly applicable, although in no manner limited, is a self-propelled vehicle power unit including a source of motive fluid, a prime mover operated by the motive fluid and whose speed varies as a function of heat input to said fluid, and a control element, such as a throttle or the like, movable between predetermined limits to vary heat input and thereby the energy content of the motive fluid as a function of throttle movement. In most cases, the motive fluid is heated by the combustion of fuel and its temperature regulated by manipulating the throttle to vary fuel input. Consequently, the rate of heat input and thereby the temperature of the motive fluid may be suddenly, rapidly increased or decreased as desired. In general, the maximum allowable heat input is a function of prime mover speed and altitude, and it therefore is necessary to limit the rate of throttle movement and thereby the rate of change in heat input in order to prevent an excessive change in motive fluid temperature and damage to the power plant by either overheating or too rapidly cooling parts of same. However, the operator should not be burdened with the responsibility of limiting the rate of throttle movement and thereby the rate of change in heat input in order to prevent the damaging of parts as there are many other factors requiring special attention particularly in connection with the operation of aircraft.

It is therefore an object of this invention to provide a power plant of the type herein specified with control apparatus automatically operative, in response to rapid, speed-changing movements of a throttle lever or other element, to vary the rate of heat input as rapidly as possible without effecting an overheating of power plant parts and/or a too rapid cooling of same.

Another object of this invention is to provide a power plant of the type herein specified with control apparatus automatically operative, in response to a rapid, speed-changing movement of a throttle lever or other element, to vary the speed of the prime mover as rapidly as possible while maintaining the temperature of the motive fluid within safe operating limits.

Another object of this invention is to provide a power plant of the type herein specified with control apparatus automatically operative to limit the initial increase or decrease in heat input in accordance with the then existing prime mover speed and/or altitude.

Another object of this invention is to provide a power plant of the type herein specified with control apparatus automatically operative to accelerate or decelerate the speed of the prime mover by initilly limiting the increase or decrease in heat input in accordance with the then existing prime mover speed and/or altitude, and as the speed of the prime mover commences to accelerate or decelerate, to then further increase or decrease heat input in accordance with changes in prime mover speed.

Another object of this invention is to provide the type of power plant herein specified with control apparatus automatically operative to accelerate or decelerate the speed of the prime mover by initially limiting and then further changing the rate of heat input in accordance with a condition inherently varying as a function of prime mover speed and/or altitude.

Another object of this invention is to provide a power plant of the type herein specified with control apparatus operative, in response to a rapid, speed-increasing-producing movement of a throttle lever or other element, to automatically accelerate the speed of the prime mover as rapidly as possible while maintaining the temperature of the motive fluid within safe operating limits, and operative when acceleration ceases, to automatically maintain the prime mover speed substantially constant within regulating limits.

Another object of this invention is to provide a fuel burning power plant of the type herein specified with control apparatus operative, in response to a rapid, speed-decreasing-producing movement of a throttle lever or other element, to automatically decrease heat input as rapidly as possible without terminating combustion and without effecting an overcooling of power plant parts, and when the rate of heat input conforms with the position of the throttle lever, to automatically maintain the speed of the prime mover substantially constant within regulating limits.

Another object of this invention is to provide a fuel burning power plant of the type herein specified with control apparatus operative, in response to a rapid, speed-decreasing movement of a throttle lever or other element, to automatically decrease heat input as rapidly as possible without terminating combustion.

Still another object of this invention is to provide the type of power plant herein specified with an improved heat-input control including apparatus automatically operative, in response to rapid, speed-changing movements of a throttle lever or other type of manually controlled primary element, to vary the rate of heat input to conform with the change in the position of the primary element as rapidly as possible without effecting either an overheating or an overcooling of power plant parts, and additional apparatus rendering the primary element actuable to manually effect an overriding, emergency control of heat input.

The construction, application and operation of apparatus embodying the invention will become readily apparent as the disclosure progresses and particularly points out additional features and advantages considered of special importance and of general application although shown and described as applied to a jet propulsion type of power plant.

Accordingly, the invention may be considered as consisting of the various combinations or subcombinations of system elements, control apparatus, devices and/or parts thereof as is more fully set forth in the detailed description and appended claims, reference being also had to the accompanying drawing, in which:

Fig. 1 schematically illustrates control apparatus embodying the invention as applied to a jet propulsion type of power plant;

Figure 1:
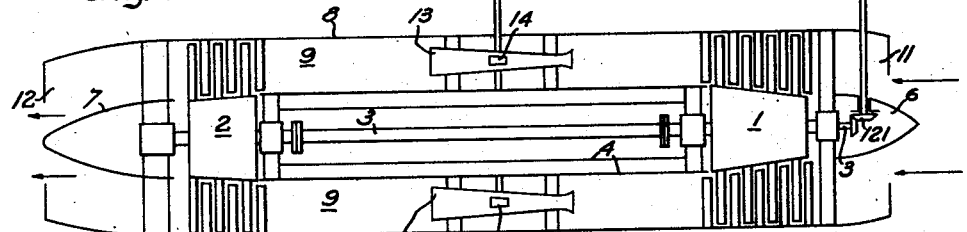

Referring to the drawing and particularly to Fig. 1, it is seen that the invention may be applied to a jet propulsion type power plant embodying a compressor 1, a turbine 2 drivingly connected with compressor 1 by means of a coaxial shaft 3, a cylindrical shell structure 4 comprising a pair of coaxial casings and enclosing shaft 3, a generally conical shell 6 enclosing the inlet end of the rotor portion of compressor 1, a generally conical shell 7 enclosing the exhaust end of the rotor portion of turbine 2; a nacelle 8 surrounding shell 6, compressor 1, shell structure 4, turbine 2 and shell 7 to form therewith an annular passage 9 which includes the bladed portions of compressor 1 and turbine 2 and which has a forwardly facing inlet portion 11 and a rearwardly directed jet forming nozzle portion 12; and one or more combustion chambers 13 arranged in passage 9 between the discharge end of compressor 1 and the inlet end of turbine 2 and each including a burner 14 to which fuel is supplied from a suitable source (not shown) through a pipe 16 including a fuel flow regulating valve 17.

Figure 2:
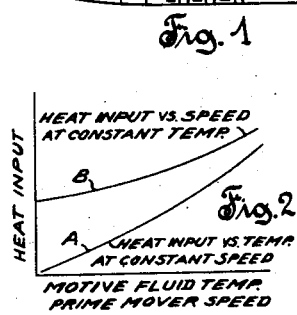
Fig. 2 shows curves illustrating in general the relation between heat input, speed and temperature.

Operation of a power plant of this type can be readily initiated in a known manner by means of a suitable starting motor (not shown), and after combustion has been established and the compressor and turbine attain a speed sufficient for self-operation, the driving connection with the starting motor may be terminated and the starting motor shut down. In general, the speed of the prime mover embodied in the power plant herein shown and described, and in other types of power plants, normally varies as a function of heat input and all that has to be done in order to either accelerate or decelerate such a prime mover and thereby an apparatus driven thereby is to vary the heat input accordingly. However, when so regulating certain types of power developing units, such for example as continuous combustion gas turbine units, by manually controlling fuel flow and thereby heat input in the usual manner, it is possible when attempting to effect a sudden, large change in speed to increase or decrease heat input with sufficient rapidity to irreparably damage parts of the unit by either overheating or too rapidly cooling same. In this connection it is of interest to note, particular reference being had to Figs. 2 and 3, that with respect to a continuous combustion gas turbine unit the temperature of the motive fluid varies as a function of heat input at constant speed (curve A of Fig. 2), that the speed of the unit varies as a function of heat input at constant temperature (curve B of Fig. 2), that the maximum allowable heat input at any selected speed varies as a function of altitude (curves C and D of Fig. 3), that for a given speed, the maximum initial increase in heat input to produce the maximum momentarily allowable temperature varies as a function of altitude and may be represented by curve E of Fig. 3 which indicates the permissible initial increase in heat input with respect to all points on curve D, and that the maximum allowable initial decrease in heat input to produce the maximum allowable sudden decrease in temperature varies as a function of altitude and may be represented by curve F of Fig. 3 which indicates the permissible initial decrease in heat input with respect to all points on curve C. Obviously, the maximum allowable initial momentary change in heat input for intermediate speeds could be represented by a series of curves generally similar to and interposed between curves C and D of Fig. 3.

If in this connection it is assumed that the disclosed unit is rotating at minimum speed at the altitude and with a heat input conforming to point $a$ on curve D and that it is desired to suddenly obtain maximum speed, the throttle lever, i. e., any manually actuated control means of the types heretofore normally employed for changing the position of valve 17 and thereby the rate of heat input, should not be moved with sufficient rapidity to effect an initial increase in heat input (the altitude remaining constant) in excess of that indicated by point $b$ on curve E, if the working parts of the unit are to be maintained at a safe operating temperature. Likewise, if the unit is rotating at maximum speed at the altitude and with a heat input conforming to point $c$ on curve C and it is desired to suddenly obtain a large reduction in speed, the throttle lever should not be moved in a heat-input-decreasing direction with sufficient rapidity to effect an initial decrease in heat input (the altitude remaining constant) in excess of that indicated by point $e$ on curve F as the immediately effected large reduction in heat input coupled with the compressor continuing to deliver large quantities of relatively cold air due to the inertia of the moving compressor and turbine parts, results in an extremely rapid and detrimental cooling of the turbine blades and other highly heated parts of the unit. In addition, the sudden large reduction in heat input, i. e., the reduction in fuel input to the combustion chamber, may result in the pressure of incoming fuel being less than the pressure of the entering air, and consequently, the flow of fuel into the combustion chamber may either cease or be reduced sufficiently to terminate burner operation. In any case, the degree to which the unit is either overheated or overcooled is dependent upon the rapidity and the extent of change in heat input.

However, it is generally desirable and in some cases imperative to rapidly effect desired changes in speed, i. e., to rapidly accelerate or decelerate the prime mover to the desired extent, in the shortest possible time without either overheating or too rapidly cooling parts of same, without terminating combustion, and without burdening the operator with the duty of carefully observing numerous instruments and progressively, accurately moving the throttle lever or other manually controlled means regulating heat input until the desired speed change is accomplished. And referring again to Fig. 1, it is seen that control apparatus automatically operative to safely accelerate or decelerate the unit to the desired extent in the shortest possible time may include, as primary control elements, a servomotor 18, a throttle lever 19, a stop means or movement limiting apparatus 20, a barometric device 21, a servomotor 22, and a speed governor 23.

Servomotor 18 comprises a double acting power piston 24 enclosed in a cylinder 26 and having oppositely extending rods 27 and 28 projecting therefrom, and a balanced pilot valve 29 enclosed in a casing 31 and having axially spaced piston portions 32, 33 and a stem portion 34. Casing 31 includes spaced drain connections 36 and 37 and an intermediate fluid inlet connection 38, and a pair of ducts or pipes 39, 41 places the opposite ends of power cylinder 26 in communication with exially spaced, interior portions of casing 31. A lever 42 has one end pivotally connected with piston rod 27 and has its intermediate portion pivotally connected with stem 34 of pilot valve 29. The end of piston rod 27 is pivotally connected with an intermediate portion of lever 43 having one end pivotally mounted on a fixed fulcrum 44. The end of piston rod 28 is operatively connected with the adjacent end of a floating lever 46 by means of a dobule acting spring link comprising a piston portion 47 on rod 28, a cylinder 48 enclosing piston 47, a pair of compression springs 49, 51 disposed within cylinder 48 on opposite sides of piston 47, and a link 52 connecting lever 46 with cylinder 48. Lever 46 is pivotally connected intermediate its ends with the stem portion of valve 17.

Throttle lever 19 is pivotally mounted on a fixed fulcrum 53 and includes an arm 54 and a handle portion 56. Arm 54 is connected with the adjacent end portion of lever 42 by means of a double acting spring link 57 including oppositely extending stem portions 58 and 59 whereas handle portion 56 is operatively associated with a quadrant 60 and may be readily moved between normal limiting positions designated MS, mimimum speed, and FS, full speed, as indicated. However, an overriding movement in either direction beyond the normal limits of movements designated MS and FS may be effected, if desired, by exerting sufficient force to compress the opposed spring 61. Arm 54 is also connected with valve 17 by means of a lever 40 pivotally mounted on a fixed fulcrum, a link 45 connecting one arm of lever 40 with an intermediate portion of floating lever 46, a link 50 having one end pivotally connected with an intermediate portion of arm 54, and a lost motion connection 55 between the other arm of lever 40 and the adjacent end of link 50 permitting throttle lever 19 to be shifted from one to the other of its two positions MS, FS without imparting movement to lever 40. However, an overriding movement of the throttle lever effects a corresponding movement of levers 40, 46 and valve 17.

Figure 4:
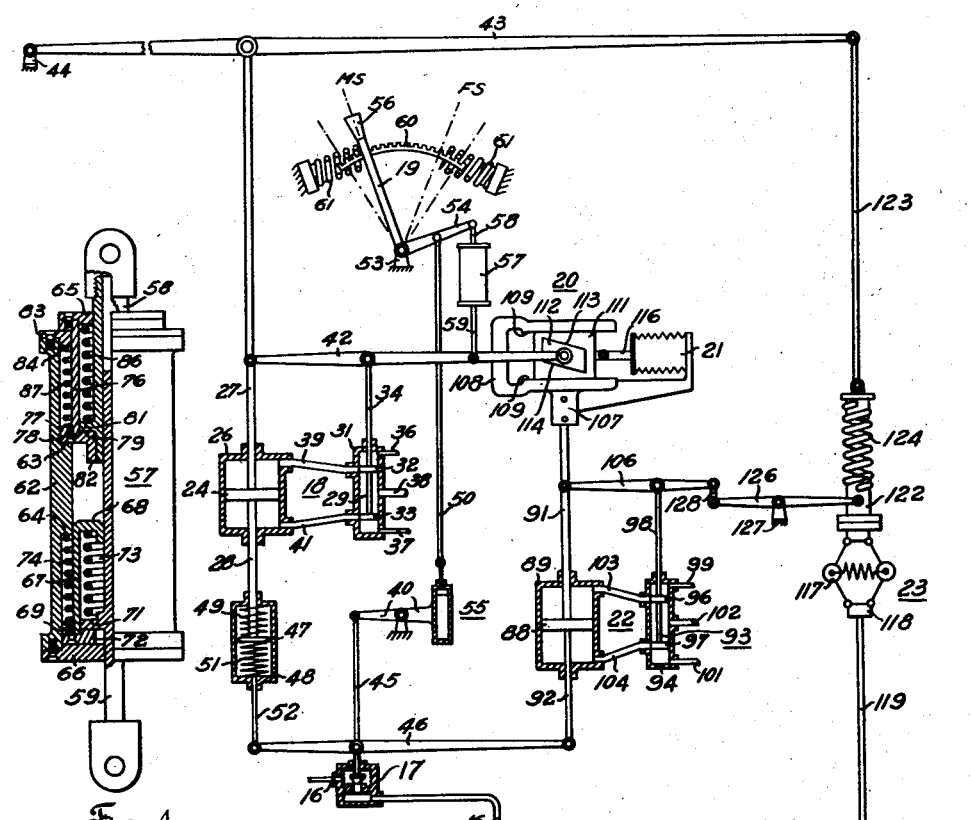
Fig. 4 is a partial longitudinal section through one of the double acting spring link constructions shown in Fig. 1.

Referring to Fig. 4, it is seen that link 57 comprises a cylinder 62 having counter-bored end portions providing a pair of axially spaced, annular internal shoulders 63 and 64, a coaxially movable cover part 65 slidably coaxially mounting a tubular stem 58, a fixed cover part 66 slidably coaxially mounting stem 59, and an internal cylindrical piston member 67 surrounding stem 59 for coaxial movement relative thereto and relative to cylinder 62. The inner end of piston 67 is provided with an inwardly projecting, annular U-shaped or channel-forming flange 68 slidably engaging stem 59 whereas its opposite or outer end is provided with an outwardly projecting annular flange 69 slidably engaging cylinder 62 in spaced opposed relation with respect to shoulder 64. Stem 59 is provided with an annular flange or spring seat 71 axially spaced from and opposing flange 68 on piston member 67. The flanged end 69 of piston 67 has detachably secured thereto an inwardly projecting annular flange 72 adapted to abut the cover side of flange 71 on stem 59. A strong compression spring 73 is interposed between flanges 68 and 71 thereby acting to retain flange 72 in abutting engagement with flange 71 as shown, and a weak compression spring 74 is interposed between shoulder 64 and flange 69 thereby acting to retain piston 67 with its flange part 72 abutting the inside surface of cover 66.

Cover part 65 has detachably secured thereto a coaxial inwardly extending cylindrical member 76 which terminates in an outwardly projecting flange 77 slidably engaging cylinder 62 adjacent shoulder 63. Flange 77 has detachably secured to the inner surface thereof an annular member 78 which is adapted to abut shoulder 63 of cylinder 62 and which projects radially inward and presents an anular shoulder 79 adapted to abut an annular flange 81 on stem 58 and a tube portion 82 slidably receiving the inner end of stem 58. In this connection, the inner end of stem 59 extends in sliding, telescoping relation within the inner end portion of tubular stem 58. The end of cylinder 62 adjacent cover 65 is provided with a detachable, annular collar 83 which may be formed of separable sections (not shown) for purposes of assembly and which terminates in an inner annular coaxial spring seat portion 84 disposed in axially spaced, opposed relation with respect to flange 77. A strong compression spring 86 is interposed between flange 81 and the opposed portion of cover 65 thereby acting to retain shoulder 79 on member 78 in abutting engagement with flange 81 on stem 58, and a weak compression spring 87 is interposed between the seat portion 84 of collar 83 and the flange 77 of cover mounted cylindrical member 76 thereby acting to retain cover part 65, cylindrical member 76 and annular member 78 positioned as shown with member 78 abutting the internal shoulder 63 of cylinder 62.

Servomotor 22 comprises a double acting power piston 88 enclosed in a cylinder 89 and having oppositely extending rods 91 and 92 projecting therefrom, and a balanced pilot valve 93 enclosed in a casing 94 and having axially spaced piston portions 96, 97 and a stem portion 98. Casing 94 includes spaced drain connections 99 and 101 and an intermediate fluid inlet connection 102, and a pair of ducts or pipes 103, 104 places the opposite ends of power cylinder 89 in communication with axially spaced interior portions of casing 94. A lever 106 has one end pivotally connected with an intermediate portion of piston rod 91 and has its intermediate portion pivotally connected with pilot valve stem 98. The upper end of piston rod 91 carries a bracket structure 107 on which is mounted the stop means 20 comprising a member 108 presenting spaced parallel guide surfaces 109 between which is slidably mounted a cam block 111 having an elongated opening or a recess 112 therein receiving the adjacent end of lever 42, the recess 112 presenting suitably shaped cam surfaces 113 and 114 disposed in vertically spaced opposed relation with respect to each other and with respect to the adjacent end of lever 42. Bracket 107 also mounts the barometric device or bellows 21, the latter including a stem portion 116 connected with cam block 111 for sliding same on guides 109 as the altitude changes, the relation between the movement of block 111 and the shape of cam surfaces 113, 114 being such that the spaces or gaps between surfaces 113, 114 and the interposed end of lever 42 are varied in accordance with curves E and F of Fig. 3 as the altitude changes. Piston rod 92 is pivotally connected with the adjacent end of floating lever 46.

Speed governor 23 includes a pair of spring coupled flyballs 117 pivotally connected with a collar 118 fixed to a rotating shaft 119 which is driven from shaft 3 by gearing 121 and with a collar 122 slidable axially of shaft 119 as the flyballs move toward or away from same. Collar 122 is connected with the adjacent end of lever 43 by means of a rod 123 having one end pivotally connected with lever 43 and a tension spring 124 having its opposite end portions secured to the adjacent opposed ends of rod 123 and collar 122. Collar 122 is also pivotally connected with the adjacent end of lever 106 by means of an interposed lever 126 having one end pivotally connected with collar 122 and an intermediate portion pivoted on a fixed fulcrum 127, and by means of a link 128 pivotally connecting the adjacent ends of levers 106 and 126.

Figure 3:
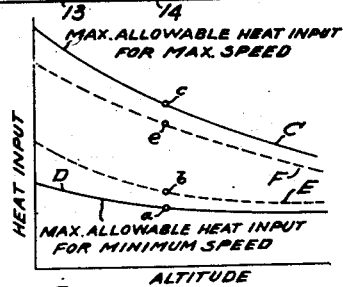
Fig. 3 shows curves illustrating the manner in which heat input and prime mover speed are affected by variations in altitude.

If it is assumed that the power plant is operating at a minimum speed and that the altitude corresponds to point $a$ on curve D of Fig. 3, i. e., with throttle lever 19 positioned as shown in Fig. 1, all that has to be done by the operator in order to quickly accelerate the prime mover to its maximum speed with a final heat input corresponding to point $c$ on curve C, assuming no change in altitude, is to suddenly move throttle lever 19 to its full speed position FS which simultaneously moves stem 58, cylinder 62 and the adjacent end of lever 42 downward until the end of the lever engages cam surface 114 whereupon stem 58 and cylinder 62 continue to move downward relative to stem 59 and piston member 67 until spring 74 is fully or nearly fully compressed. The initial clockwise movement of lever 42 moves pilot valve 29 downward thereby placing duct 41 in communication with a source of fluid under pressure (not shown) through inlet pipe 38 and placing duct 39 in communication with drain connection 36 whereupon power piston 24 moves upward until the resulting movement of lever 42 returns pilot valve 29 to its neutral position shown. The upward movement of power piston 24 pivots lever 46 in clockwise direction about its point of connection with piston rod 92 and further opens valve 17 to increase the supply of fuel to burner 14 and thereby the rate of heat input to the motive fluid entering turbine 2. The upward movement of power piston 24 also pivots lever 43 in a counterclockwise direction about its fulcrum 44 thereby further tensioning spring 124 which in turn moves collar 122 upward and flyballs 117 inward toward the axis of shaft 119. This movement of collar 122 causes lever 126 to pivot in a counterclockwise direction about its fulcrum 127 which in turn pivots lever 106 in a clockwise direction about its point of connection with piston rod 91 whereupon pilot valve 93 moves downward placing duct 104 in communication with a source of fluid under pressure (not shown) through inlet pipe 102 and placing duct 103 in communication with drain connection 99. As a result, power piston 88 also moves upward until pilot valve 93 is returned to its neutral position shown and in so doing further opens fuel valve 17 and moves stop means 20, barometric device 21 and the end of lever 42 engaged by cam surface 114 upward which in turn acts through servomotor 18 to effect a closing movement of fuel valve 17.

However, the floating levers 42, 46 and 106 are so connected with their movable actuators and with the stem portions of the valves actuated thereby that the net result of the servomotor movements just described is an actual opening of fuel valve 17 to the extent necessary to immediately increase and limit the initial increase in heat input to that which produces the maximum temperature momentarily allowable for the then existing prime mover speed and altitude, for example to the extent indicated by point $b$ on curve E. The further tensioning of governor spring 124, which constitutes an adjustable speed setting, conditions the governor for higher speed operation, and since an increase in heat input causes the unit to speed up or accelerate (note curve B of Fig. 3), governor flyballs 117 commence to move outward thereby pivoting lever 126 in a clockwise direction about its fulcrum 127 which in turn pivots lever 106 in a counterclockwise direction about its point of pivotal connection with piston rod 91 and effects an upward movement of pilot valve 93.

Consequently, power piston 88 moves downward until pilot valve 93 is returned to its neutral position and thereby effects a heat input reducing movement of fuel valve 17 and a simultantous downward movement of limiting apparatus 20 and barometric device 21. However, the adjacent end of lever 42 moves downward and remains in continuous engagement with stop surface 114 due to the action of compressed spring 74 in cylinder 62, and as previously pointed out, such a movement of lever 42 results in an upward movement of power piston 24 and thereby a counterclockwise movement of lever 43 which further tensions spring 124 and effects a clockwise movement of lever 46 and which further opens fuel valve 17 to effect a net increase in heat input whereupon the substantially simultaneous, cyclic actuation of servomotors 18 and 22 continues until spring 74 in cylinder 62 expands to the normal extent shown, i. e., until piston member 67 and stem 59 move downward to the extent determined by the position of the throttle lever.

In this connection, it should be noted that any downward movement of stem 59 and lever 42 results in a further tensioning of governor spring 124 and that therefore the last downward movement of stem 59 to be effected by the action of spring 74 in cylinder 62 produces a further increase in speed sufficient to actuate servomotor 22 and move power piston 88 and thereby stop means 20 and barometric device 21 downward to a position in which cam surface 114 is out of engagement with the adjacent end of lever 42 which is then disposed in spaced relation with respect to both cam surfaces thereby permitting power piston 88 to move a limited extent in either direction without imparting movement to lever 42. Consequently, governor 23 is conditioned to maintain the speed of the unit substantially constant within regulating limits since any variation in speed from that determined by the degree of tension finally imparted to spring 124 will result in flyballs 117 moving levers 126, 106 and pilot valve 93 to effect an appropriate fuel valve regulating movement of power piston 88.

If it is now assumed that throttle lever 19 is in position FS and the unit is operating at the maximum speed and altitude indicated by point c on curve C and that it is desired to suddenly operate the unit at its minimum speed, all that has to be done is to quickly move the throttle lever to minimum speed position MS which in turn moves cylinder 62 and stem 59 upward and lever 42 counterclockwise about its point of pivotal connection with piston rod 27 until the movement of stem 59 is arrested by engagement of the adjacent end of lever 42 with cam surface 113 whereupon the cover 65 including cylindrical portion 76 thereof and stem 58 continues to move upward relative to stem 59 and cylinder 62 until spring 87 is substantially fully compressed. The upward or counterclockwise movement of lever 42 effects an upward movement of pilot valve 29 which in turn effects a downward movement of power piston 24 and thereby a limited clockwise, spring-tension-decreasing movement of lever 43 and a limited counterclockwise, valve-closing movement of lever 46. A decrease in the tension of spring 124 results, due to the inertia of rotating prime mover parts, in an immediate, outward movement of governor flyballs 117 and a downward movement of collar 122 which in turn moves levers 126, 106 and pilot valve 93 in directions effecting a downward movement of power piston 88, stop means 20 and barometric device 21 and consequently a further closing of valve 17, and a downward movement of lever 42 since the latter is held in engagement with cam surface 113 by the action of spring 87 in cylinder 62. However, although the last mentioned movement of lever 42 does effect a fuel valve opening movement of power piston 24, the net result is a partial closing of fuel valve 17 and a reduction in heat input conforming to that indicated by point e on curve F which in turn results in a reduction in prime mover speed and an upward movement of servomotor power piston 88, stop means 20, barometric device 21 and the adjacent end of lever 42, the cycle of operations just described continuing until the adjacent end of lever 42 ceases to move upward due to the action of spring 87 in cylinder 62 whereupon the last upward movement of power piston 88 disengages cam surface 113 from the adjacent end of lever 42 thereby repositioning the various parts in the relation shown in Fig. 1.

Regarding operation of a power plant as hereinbefore described, it may be well to further point out that when the prime mover is operating at a selected speed, for example at full or maximum speed and at an altitude conforming to point c on curve C of Fig. 3, an increase in altitude tends to effect an increase in prime mover speed whereas a decrease in altitude tends to effect a reduction in prime mover speed, that as the speed commences to change, governor 23 actuates servomotor 22 to effect a corrective change in the rate of heat input, i. e., a change tending to maintain the speed of the prime mover substantially constant, that an initial change in the rate of heat input is permitted without effecting an actuation of lever 42 by the gap or space between the cam surfaces 113, 114 and the interposed end of lever 42, and that barometric device 21 shifts cam block 111 in accordance with changes in altitude to maintain a width of gap sufficient for the normal speed regulating operation of governor 23. Consequently it should now be obvious that with throttle lever 19 set in any selected position within its normal range of operation including the minimum and full speed limiting positions, MS and FS, the rate of heat input will be automatically changed in accordance with variations in altitude to maintain the speed of the prime mover substantially constant within regulating limits and at a value determined by the position of the throttle lever. In addition, it should be borne in mind that the disclosed apparatus automatically functions to complete an initiated change in heat input, i. e., a change resulting from the actuation of the throttle lever or other element, at a rate which is a function of prime mover speed.

Moreover, if for any reason servomotors 18 and 22 should fail to operate and it becomes necessary or desirable to manually control heat input, all that has to be done is to move throttle lever 19 in the desired direction until the lost motion between link 50 and lever 40 is taken up whereupon a continued movement of the lever in the same direction would then actuate fuel valve 17. In this connection, if either servomotor becomes inoperative, lever 42 and stem 59 are in effect fixed and a movement of the throttle lever to take up slack (lost motion) in connection 55 is permitted, depending upon the direction of movement, by the compression of either spring 74 or 87 in cylinder 62 whereupon a continued movement of the lever in the same selected direction and an actuation of fuel valve 17 is permitted by the compression of either spring 73 or 86. In addition, the successive compression of the pairs of weak and strong springs 74, 73 and 87, 86 in cylinder 62 permits manually overriding the automatic regulation of heat input effected by the conjoint action of servomotors 18, 22 and governor 23 simply by moving the throttle lever beyond its normal FS and MS limits as permitted by the quadrant mounted compression springs 62.

It should now be obvious that the illustrated control apparatus normally operates automatically, in response to rapid, speed-changing movements of a throttle lever or other element, to momentarily limit the initiated change in heat input to the extent producing the maximum allowable momentary change in motive fluid temperature consistent with the then existing prime mover speed and/or altitude, to complete the initiated change in heat input as rapidly as possible without terminating combustion and without effecting either an overheating or a too rapid cooling of parts, and to then maintain the speed of the prime mover substantially constant within regulating limits and regardless of changes in altitude until the position of the throttle lever is again changed, and in addition, affords the emergency and overriding control features mentioned in the preceding paragraph.

The invention is applicable to all types of power units in which the speed of the prime mover varies as a function of heat input irrespective of whether the governing device employed responds directly to changes in prime mover speed or to another condition which inherently varies as function of speed, and although it is of particular advantage in connection with the operation of continuous combustion gas turbine power units, it should be understood that the number, type, arrangement, and adjustment of the actuators and of the interconnecting levers, spring links and other parts may be varied as desired in order to control heat input in accordance with the broad aspects of this invention, and that it is not intended to limit the invention to the application or to the exact construction, arrangement and combination of control elements and parts thereof herein shown and described for purposes of illustration as various modifications within the scope of the appended claims may occur to persons skilled in the art.

It is claimed and desired to secure by Letters Patent:

1. In combination in control apparatus for a power plant including a source of motive fluid, a prime mover operated by said motive fluid and whose speed varies as a function of heat input to said fluid, a member movable to vary heat input to said fluid, and a control element operatively associated with said member and selectively positionable to move said member from one position to another position to thereby vary heat input to the motive fluid with sufficient rapidity, at least in some instances, to exceed the maximum variation in motive fluid temperature permissible for safe operation, means responsive to a rapid movement of said element from one position to another position for stopping and retaining said member in an intermediate position effective to limit the initial change in the rate of heat input to the maximum value permissible for safe operation at the then existing prime mover speed, and additional means operatively associated with said prime mover and operatively controlling said first mentioned means for further moving said member in the direction initiated to thereby further change heat input at a rate commensurate with the rate of change of prime mover speed until the rate of heat input and the speed of the prime mover conform with the other position of said element, said additional means being then operative to control the position of said member to thereby vary the rate of heat input as the speed of the prime mover commences to change in response to changes in load so as to maintain the speed of the prime mover substantially constant within regulating limits until the position of said element is changed.

2. In combination in control apparatus for a power plant including a source of motive fluid and a prime mover which is operated by the motive fluid and whose speed varies as a function of heat input to said fluid, a member for regulating heat input to the motive fluid, a movable control element, a governing device having an adjustable setting and being movable in response to changes in prime mover speed, means operatively connecting said control element and member including at least two relatively movable parts, a stop means positioned to arrest the movement of one of said parts and thereby a heat-input- varying movement of said member as said control element and the other one of said parts are moved to and retained in positions tending to effect a further heat-input-varying movement of said member, means operative to adjust the bias of said governing device in response to and in accordance with the movement of said control element, and means operatively connecting said stop means and governing device for withdrawing said stop means from said one part in accordance with changes in prime mover speed.

3. In combination in control apparatus for a power plant including a source of motive fluid and a prime mover which is operated by the motive fluid and whose speed varies as a function of heat input to said fluid, a member for regulating heat input to the motive fluid, a control element, a governing device having an adjustable setting and being movable in response to changes in prime mover speed, means operatively connecting said control element and member including at least two relatively movable parts, a stop means positioned to arrest the movement of one of said parts and thereby a heat-input-varying movement of said member as said control element and the other one of said parts are moved to and retained in positions tending to effect a further heat-input-varying movement of said member, means operative to adjust the setting of said governing device in response to and in accordance with the movement of said control element, means operatively connecting said stop means and governing device for withdrawing said stop means from said one part in accordance with changes in prime mover speed, and additional means rendering movements of said governing device operative to adjust and control the position of said member.

4. In combination in control apparatus for a power plant including a source of motive fluid and a prime mover which is operated by the motive fluid and whose speed varies as a function of heat input to said fluid, a member for regulating heat input to the motive fluid, a selectively positionable control element, a governing device having an adjustable setting and being movable in response to changes in prime mover speed, means operatively connecting said control element and member including at least two relatively movable parts, an adjustable stop means positioned to arrest the movement of one of said parts and thereby a heat-input-varying movement of said member as said control element and the other one of said parts are moved to and retained in positions tending to effect a further heat-input-varying movement of said member, means operative to adjust the setting of said governing device in response to and in accordance with the movement of said control element, means operatively connecting said stop means and governing device for withdrawing said stop means from said one part in accordance with changes in prime mover speed, and additional means for further adjusting said stop means in accordance with changes in atmospheric pressure.

5. In combination in control apparatus for a power plant including a source of motive fluid and a prime mover which is operated by the motive fluid and whose speed varies as a function of heat input to said fluid, a member for regulating heat input to the motive fluid, a selectively positionable control element, a governing device having an adjustable setting and being movable in response to changes in prime mover speed, means operative to adjust the setting of said governing device in response to and in accordance with the movement of said control element, and means rendering said control element and said governing device jointly and severally operative to move said member, said means including parts rendering said governing device additionally operative to limit, until the speed of the prime mover commences to change, the extent said member can be initially moved by actuation of said control element.

6. In combination in control apparatus for a power plant including a source of motive fluid and a prime mover which is operated by the motive fluid and whose speed varies as a function of heat input to said fluid, a member for regulating heat input to the motive fluid, a movable control element, a governing device movable in response to changes in prime mover speed, and means rendering said control element and said governing device jointly and severally operative to move said member, said means including parts rendering said governing device additionally operative to limit, until the speed of the prime mover commences to change, the extent said member can be initially moved by actuation of said control element.

7. In combination in control apparatus for a power plant including a source of motive fluid and a prime mover which is operated by the motive fluid and whose speed varies as a function of heat input to said fluid, a member for regulating heat input to the motive fluid, a selectively positionable control element, a governing device movable in response to changes in prime mover speed, and means rendering said control element and said governing device jointly and severally operative to move said member, said means including parts rendering said governing device additionally operative to limit, until the speed of the prime mover commences to change, the extent said member can be initially moved to vary heat input by actuation of said control element, and additional means responsive to variations in atmospheric pressure for changing the ultimate extent said member can be moved to vary heat input.

8. In combination in control apparatus for a power plant including a source of motive fluid and a prime mover which is operated by the motive fluid and whose speed varies as a function of heat input to said fluid, a member for regulating heat input to the motive fluid, a selectively positionable control element, a governing device movable in response to changes in prime mover speed, and means rendering said control element and said governing device jointly and severally operative to move said member, said means including parts rendering said governing device additionally operative to limit, in accordance with the then existing speed, the extent said member can be initially moved to vary heat input by an actuation of said control element, and operative in conjunction with said control element to continue moving said member to vary heat input in accordance with changes in prime mover speed until the prime mover attains a speed commensurate with the setting of said control element.

9. In combination in control apparatus for a power plant including a source of motive fluid and a prime mover which is operated by the motive fluid and whose speed varies as a function of heat input to said fluid, a member for regulating heat input to the motive fluid, a selectively positionable control element, a governing device movable in response to changes in prime mover speed, and means including a barometric device for rendering said control element and said governing device jointly and severally operative to move said member, said means including parts rendering said governing device additionally operative to limit, in accordance with the then existing conditions of speed and atmospheric pressure, the extent said member can be initially moved to vary heat input by actuation of said control element, and rendering the conjoint action of said control element and governing device effective to continue the movement of said member to vary heat input as a function of the prime mover speed until the speed of the prime mover is changed to the extent determined by the setting of said control element and the atmospheric pressure.

10. In combination in control apparatus for a power plant including a source of motive fluid and a prime mover which is operated by the motive fluid and whose speed varies as a function of heat input to said fluid, a member for regulating heat input to the motive fluid, a selectively positionable control element, a governing device movable in response to changes in prime mover speed, and means including a barometric device for rendering said control element and governing device jointly and severally operative to move said member, said means including parts rendering the conjoint action of said governing and barometric devices operative to limit, in accordance with the then existing conditions of speed and atmospheric pressure, both the initial and ultimate extent to which said member can be moved to vary heat input by the conjoint action of said control element and governing device.

11. In combination in control apparatus for a power plant including a source of motive fluid and a prime mover which is operated by the motive fluid and whose speed varies as a function of heat input to said fluid, a member for regulating heat input to the motive fluid, a selectively positionable control element, a governing device movable in response to changes in prime mover speed, means rendering said control element and said governing device jointly and severally operable to move said member, said means including parts rendering said governing device additionally operative to limit, until the speed of the prime mover commences to change, the extent said member can be initially moved to increase heat input by actuation of said control element, and means including a barometric device for altering both the initial and ultimate extent to which said member can be moved to vary heat input.

12. In combination in control apparatus for a power plant including a source of motive fluid and a prime mover which is operated by the motive fluid and whose speed varies as a function of heat input to said fluid, a member for regulating heat input to the motive fluid, a control element selectively positionable throughout a normal range of movement including minimum and full speed limiting positions, a governing device movable in response to changes in prime mover speed, means rendering said control element and said governing device jointly and severally operative to move said member, said means including parts rendering said governing device additionally operative to limit, until the speed of the prime mover commences to change, the extent said member can be initially moved by actuation of said control element throughout its said normal range of movement, and additional means rendering said element movable beyond the limits of said normal range and operative when so moved to actuate said member and vary heat input irrespective of the operation of said governing device.

13. In combination in control apparatus for a power plant including a source of motive fluid, a prime mover operated by said motive fluid and whose speed varies as a function of heat input to said fluid, and means including a control element selectively positionable throughout a normal range of movement including minimum and full speed limiting positions to vary heat input to the motive fluid with sufficient rapidity, at least in some instances, to exceed the maximum variation in motive fluid temperature permissible for safe operation, means automatically operative in response to a rapid movement of said element from one position to another position within said normal range for limiting the initial change in the rate of heat input to the maximum value permissible for safe operation at the then existing prime mover speed, and for further changing heat input at a rate commensurate with the rate of change of prime mover speed until the rate of heat input and the speed of the prime mover conform with the other position of said element, and additional means rendering said element movable beyond the limits of said normal range and operative when so moved to vary heat input irrespective of the operation of said automatic means.

14. In combination in control apparatus for a power plant including a source of motive fluid, a prime mover operated by said motive fluid and whose speed varies as a function of heat input to said fluid, and means including a control element selectively positionable throughout a normal range of movement including minimum and full speed limiting positions to vary heat input to the motive fluid with sufficient rapidity, at least in some instances, to exceed the maximum variation in motive fluid temperautre permissible for safe operation, means automatically operative in response to a rapid movement of said element from one position to another position within said normal range for limiting the initial change in the rate of heat input to the maximum value permissible for safe operation at the then existing prime mover speed, for further changing heat input at a rate commensurate with the rate of change of prime mover speed until the rate of heat input and the speed of the prime mover conform with the other position of said element, and for then varying the rate of heat input as the speed of the prime mover commences to change in response to changes in load so as to maintain the speed of the prime mover substantially constant within regulating limits until the position of said element is changed, and additional means rendering said element movable beyond the limits of said normal range and operative when so moved to vary heat input irrespective of the operation of said automatic means.

15. In combination in control apparatus for a power plant including a source of motive fluid, a prime mover operated by said motive fluid and whose speed varies as a function of heat input to said fluid, and means including a control element selectively positionable to vary heat input to the motive fluid with sufficient rapidity, at least in some instances, to exceed the maximum variation in motive fluid temperature permissible for safe operation, second means automatically operative in response to a rapid movement of said element from one position to another position for limiting the initial change in the rate of heat input to the maximum value permissible for safe operation at the then existing prime mover speed, and additional means operatively associated with said prime mover and operatively controlling said second means for further changing heat input at a rate commensurate with the rate of change of prime mover speed until the rate of heat input and the speed of the prime mover conform with the other position of said element.

16. In combination in control apparatus for a power plant including a source of motive fluid, a prime mover operated by said motive fluid and whose speed varies as a function of heat input to said fluid, and means including an element selectively positionable to vary heat input to the motive fluid wtih sufficient rapidity, at least in some instances, to exceed the maximum temperature permissible for safe operation, second means operative in response to a rapid heat-input-increasing movement of said element for initially limiting the resulting increase in the rate of heat input and thereby the temperature of the motive fluid to the maximum value momentarily permissible for safe operation, and additional means operatively associated with said prime mover and operatively controlling said second means for further increasing heat input as a function of prime mover speed until acceleration of the prime mover ceases.

17. In combination in control apparatus for a power plant including a source of motive fluid, a prime mover operated by said motive fluid and whose speed varies as a function of heat input to said fluid, and means including a control element selectively positionable to vary heat input to the motive fluid with sufficient rapidity, at least in some instances, to exceed the maximum variation in motive fluid temperature permissible for safe operation, second means operative in response to a rapid movement of said element from one position to another position for limiting the initial change in the rate of heat input to the maximum value permissible for safe operation at the then existing atmospheric pressure, and additional means operatively associated with said prime mover and operatively controlling said second means for further changing heat input at a rate commensurate with the rate of change of prime mover speed until the rate of heat input and the speed of the prime mover conform with the other position of said element.

18. In combination in control apparatus for a power plant including a source of motive fluid, a prime mover operated by said motive fluid and whose speed varies as a function of heat input to said fluid, and means including a control element selectively positionable to vary heat input to the motive fluid with sufficient rapidity, at least in some instances, to exceed the maximum variation in motive fluid temperature permissible for safe operation, second means operative in response to a rapid movement of said element from one position to another position for limiting the initial change in the rate of heat input to the maximum value permissible for safe operation at the then existing prime mover speed and atmospheric pressure, and additional means operatively associated with said prime mover and operatively controlling said second means for further changing heat input at a rate commensurate with the rate of change of prime mover speed until the rate of heat input and the speed of the prime mover conform with the other position of said element, said additional means including parts operative to alter the ultimate extent of the change in heat input in accordance with variations in atmospheric pressure.

19. In combination in control apparatus for a power plant including a source of motive fluid, a prime mover operated by said motive fluid and whose speed varies as a function of heat input to said fluid, and means including a control element selectively positionable to vary heat input to the motive fluid with sufficient rapidity, at least in some instances, to exceed the maximum variation in motive fluid temperature permissible for safe operation, second means operative in response to a rapid movement of said element from one position to another position for limiting the initial change in the rate of heat input to the maximum value permissible for safe operation at the then existing prime mover speed and atmospheric pressure, additional means operatively associated with said prime mover and operatively controlling said second means for further changing heat input at a rate commensurate with the rate of change of prime mover speed until the rate of heat input and the speed of the prime mover conform with the other position of said element, and a barometric device controlling said additional means and being operative to alter the ultimate extent of the change in heat input in accordance with variations in atmospheric pressure, said additional means being operative to vary the rate of heat input as the speed of the prime mover commences to change in response to changes in load so as to maintain the speed of the prime mover substantially constant within regulating limits until the position of said element is changed.

JAMES L. RAY.

REFERENCES CITED

The following references are of record in the file of this patent:

UNITED STATES PATENTS

| Number | Name | Date |
|---|---|---|
| 1,839,257 | Pfau | Jan. 5, 1932 |